United States Patent [19]
Sutton et al.

[11] Patent Number: 5,453,618
[45] Date of Patent: Sep. 26, 1995

[54] MINIATURE INFRARED LINE-SCANNING IMAGER

[75] Inventors: Marcus L. Sutton, Gilbert; Timothy R. Beystrum, Phoenix, both of Ariz.

[73] Assignee: Litton Systems, Inc., Woodland Hills, Calif.

[21] Appl. No.: 190,671

[22] Filed: Jan. 31, 1994

[51] Int. Cl.⁶ ................. G01J 5/08; H04N 5/33
[52] U.S. Cl. .......... 250/334; 250/332; 250/352; 250/370.15
[58] Field of Search ................. 250/332, 334, 250/347, 352, 370.08, 370.15

[56] References Cited

U.S. PATENT DOCUMENTS

| | | | |
|---|---|---|---|
| 3,786,269 | 1/1974 | Cooper | 250/334 |
| 4,215,273 | 7/1980 | Stokes et al. | 250/347 |
| 4,225,883 | 9/1980 | Van Atta et al. | 250/334 X |
| 4,751,571 | 6/1988 | Lillquist | 250/332 X |
| 4,914,296 | 4/1990 | Reinhold et al. | 250/332 X |
| 4,963,963 | 10/1990 | Dorman | 250/334 X |
| 4,977,323 | 12/1990 | Jehle | 250/334 X |
| 5,283,551 | 2/1994 | Guscott | 250/334 X |

*Primary Examiner*—Carolyn E. Fields
*Assistant Examiner*—Edward J. Glick
*Attorney, Agent, or Firm*—Poms, Smith, Lande & Rose

[57] ABSTRACT

An infrared line-scanning imager includes a scanner having an optical system, infrared linear photoconductive detector providing an analog image signal, cooler, and conversion electronics for converting the image signal from the detector to digital electrical and digitally-encoded optical formats, all on a moving scanning platform of the scanner. The digitally-encoded optical format of the image signal takes the form of an encoded light beam which is beamed off of the moving scanning platform to a receiver on the stationary portion of the scanner. From the scanner, the image signal is transmitted in the optical format over a fiber optic cable to a reformatting, processing, analysis, and display portion of the imager. This latter portion of the imager allows the image signal to be converted once again to digital electronic format for processing, pattern recognition, image enhancement, storage, delayed display and comparison, and display in near-real time if desired.

31 Claims, 9 Drawing Sheets

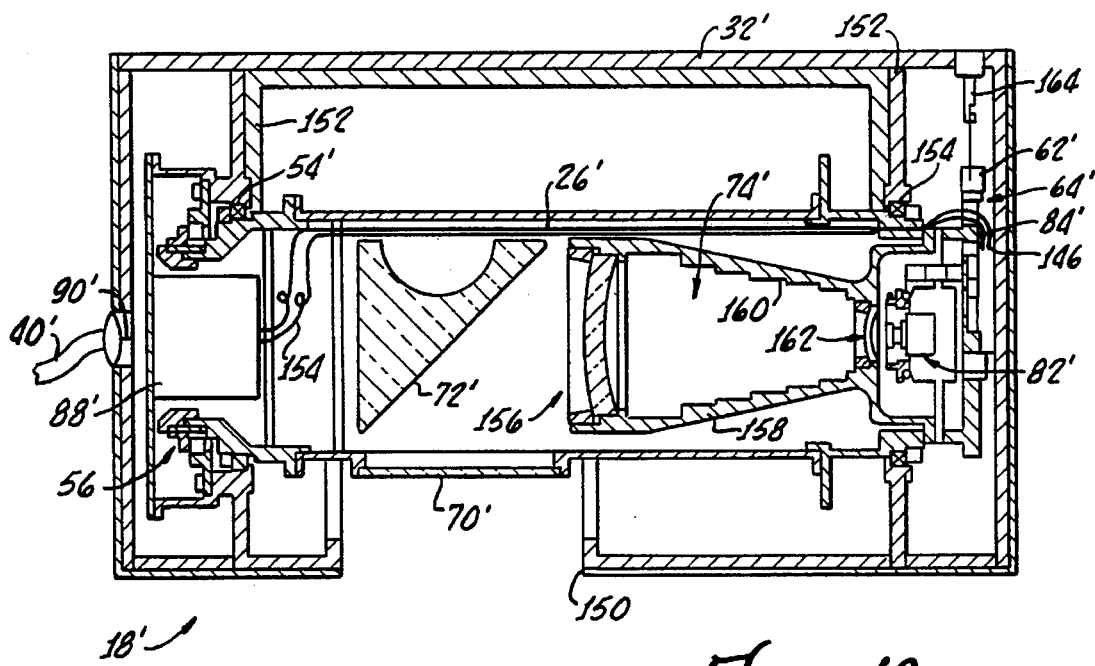
FIG. 10.
FIG. 11.
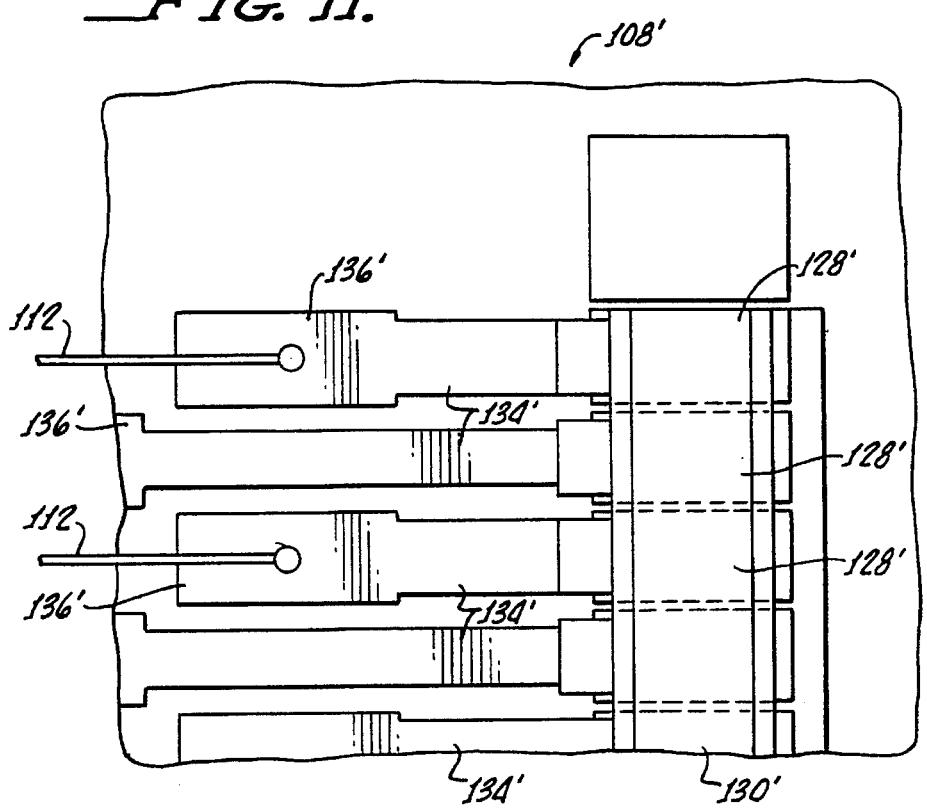

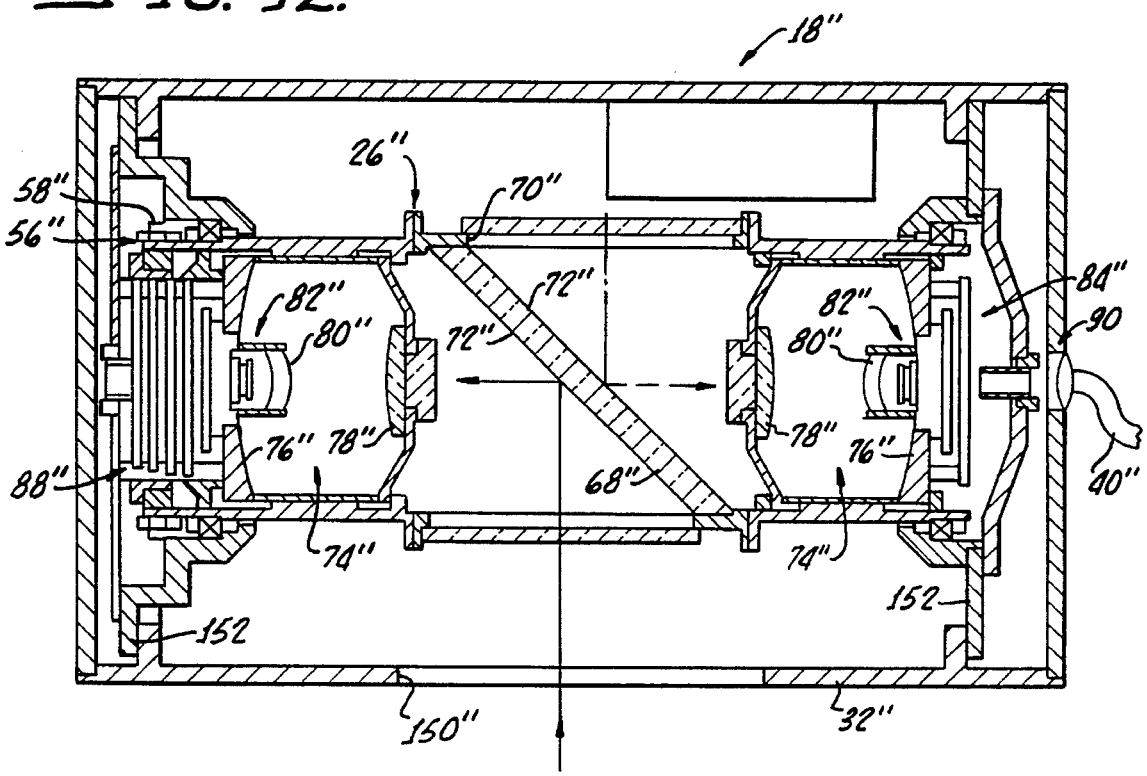
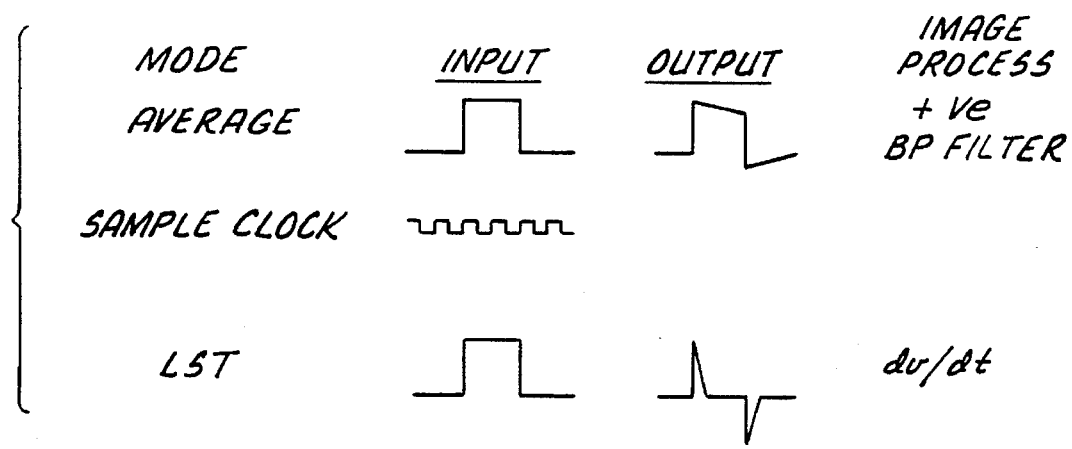

MINIATURE INFRARED LINE-SCANNING IMAGER

BACKGROUND OF THE INVENTION

1. Field of the Invention

The present invention is in the field of imaging devices. More particularly, the present invention is in the field of imaging devices which provide a visible image from invisible infrared radiation. Still more particularly, this invention is in the field of devices, which on a moving scanning platform includes optics for receiving infrared radiation and directing this radiation to an electronic detector including plural photo-conductive pixel elements. The pixel elements are responsive to infrared radiation to substantially simultaneously record image information from an image line of the scene. Each image line has a width of one pixel so that a series of lines side by side can build up an image mosaic similarly to the way a television picture is created. Sequential image lines are recorded so that the entire scene is recorded as the scanning platform moves. Adjacent image lines cooperatively form a mosaic image of the scene viewed through the scanner optics. As the imaging scan progresses, simultaneous analogue image information from the pixels of the electronic detector is stored, is then sequentially fed out, and is converted to analog serial information. This analog serial information is converted to parallel digital information, and then to serial digital information for imposition upon a light beam coupling the information off of the moving scanning platform.

This light beam is received by a receiver on a stationary base or housing without the use of slip rings, flexible signal-carrying conductors, or other physical signal-carrying structure extending between the moving scanning platform and the stationary parts of the scanner. On the scanner base, the receiver connects the optical output signal received from the moving platform of the scanner to a facility, which can be selectively varied in its configuration, for conversion into an electrical signal. This resulting electrical image signal is further processed to provide image information in a variety of forms. The resulting image information may be stored for later analysis or viewing, and also may be presented in near real-time on a viewing screen, such as on a computer CRT or LCD screen, or on a television set, dependent upon the configuration(s) selected for the conversion facility.

2. Related Technology

Conventional optical scanners have been known which use an optical system with rotating mirrors and a fixed, single-pixel detector. Other conventional optical scanners have used similar optical systems along with fixed, high-cost, HgCdTe multi-pixel detector arrays. These conventional scanners have generally relied on reciprocating or oscillating optical scanning apparatus with a fixed detector. Inherently, alignment problems arise between a moving optical system (i.e., the scanning mirror and associated lenses), and the stationary infrared radiation detector. These alignment problems seriously compromise the performance of such a scanner, and result in a trouble-prone system which requires frequent maintenance and adjustments.

The conventional optical scanners also used sensors which were of high cost; involved a considerable level of complexity; have very complex, expensive, and possibly trouble-prone rotating, oscillating, or reciprocating mirror systems; and had a high initial acquisition cost and high maintenance costs. As an example only, the conventional technology would provide an infrared scanner with a moving optical system delivering infrared radiation from a scene to be imaged to a fixed photovoltaic detector. The detector would be cooled by a cryostat or cryocooler, so that the complexity of this cooling apparatus must also be considered in the overall complexity and cost of the imaging system. This conventional imager would also potentially have difficulties or require high maintenance because of the stringent alignment requirements between the scanner and detector. Also, the conventional system would have an initial acquisition cost of about $300,000 to $400,00 dollars. In contrast, the present infrared line-scanning imager achieves a number of cost-reducing simplifications and improvements which can provide an infrared line-scanning imager of comparable performance at an initial cost of about $50,000, in equivalent quantities.

SUMMARY OF THE INVENTION

Accordingly, an object of the present invention is to provide an infrared scanning imaging system which employs a detector of low cost.

A further objective of the present invention is to provide such an infrared imaging scanner system which employs a photo-conductive detector.

Such a photo-detector may be provided according to another object of the present invention by the use of a lead selenide (PbSe) photoconductive detector.

Additionally, according to another object of the present invention, such an infrared scanning imaging system can be provided with a scanner which is free of slip rings or flexible conductors for transferring control or image signals to or from the moving platform of the scanner.

Such a scanning imaging system can be provided according to an objective of the present invention by providing all optics, photoconductive detector, electronics for signal extraction from the detector, thermal control and thermo-electric cooling for the infrared detector, and signal transmission off-scanner, all on the moving platform of the scanner.

According to this objective of the present invention, such an imaging scanner system can be provided by using slip rings or an equivalent, to transmit only power to the moving platform of the scanner.

According to a further objective of the present invention, such an imaging scanner system is provided by mounting the optics and detector both on the moving platform of the scanner, thereby to provide a rigid structure free of any alignment problems between a moving optical system and a stationary detector as has been encountered in prior conventional optical scanners.

Still further, an objective of the present invention is to provide such a scanning imaging system in which the moving platform the scanner is rotationally driven by a brush-less DC servo motor at a precisely controlled and uniform speed in accord with the scan rate of the scanning system. The rotational driving of the moving platform eliminates reciprocating or oscillating drives encountered in prior optical scanners.

Accordingly, the present invention provides a scanning infrared imaging apparatus comprising an infrared detector having an array of plural photoconductive infrared detector elements each providing a corresponding one of plural electrical signals indicative of infrared radiation falling thereon, a multiplexing circuit successively selecting one of the plural electrical signals and connecting a corresponding signal to a singular output conductor, and a scanner delivering infrared radiation from a scene to be imaged to said detector.

According to another aspect the present invention provides an infrared line-scanning imager including a scanner portion comprising, a base housing movably carrying a scanning platform, an optical unit carried by the scanning platform for receiving infrared radiation from a distant scene and focusing this infrared radiation upon an infrared detector, an infrared detector module carried upon the scanning platform and including the infrared detector which has plural photoconductive infrared detector elements linearly arrayed, with each detector element providing one of a corresponding plurality of electrical signals indicative of infrared radiation flux falling on the corresponding detector element, a multiplexing circuit sequentially connecting selected ones of the plurality of electrical signals to a single output conductor, a multi-stage thermoelectric cooler in heat-transfer relation with and cooling each of said infrared detector and said multiplexing circuit, and a thermal housing enclosing all of the infrared detector, the multiplexing circuit, and the thermoelectric cooler, and this thermal housing providing for conducting electrical power into said housing and of transfer of heat and said electrical signals out of said housing, an electronics/optical assembly carried upon the scanner platform for receiving the electrical signals from the infrared detector of the detector module and for converting these electrical signals into an optically-encoded serial digital signal, and also for beaming this optically-encoded signal off of the movable scanning platform.

Advantages of the present invention derives from its use of thermoelectric cooling, as opposed to using a more complex and limited cryostat, cryocooler or cryoprobe; from its simplified construction having an optical system, cooler, and infrared detector all carried on a scanning platform along with electronics for image-signal conversion to a digitally-encoded optical beam which is then beamed off of the scanning platform to a stationary receiver. The present invention further provides an infrared scanning imager of low cost and rugged construction suitable for use a variety of industrial and air-borne environments. The present infrared scanning imager may be used for a variety of purposes, ranging from industrial security, to air-borne crop monitoring, and including such other air-borne imaging and assessment functions as assessment of thermal and chemical pollution in lakes, streams and rivers. For example, in an agricultural environment, the present infrared scanning imager can be used to detect the difference in temperature between diseased crops from healthy plants, and to direct aerial spraying of insecticides and fungicides, for example. With crop plants and other types of vegetation, disease of the plants may affect their transpirational cooling and produce a resulting difference in plant temperature between healthy and diseased plants, which temperature difference can be detected with the present infrared imager. Also, healthy and properly-watered plants can similarly be distinguished from overly-dry plants, so that water resource may be best allocated in time of drought.

The beginnings of forest fires, or of industrial processing plant fires, can be remotely detected at a distance in much the same way that forest rangers now use binoculars to look for smoke. However, the present scanning infrared imager does not rely on visible smoke, and may detect a fire before its smoke would be visible to a human observer. Importantly, the present scanning infrared imager can scan a forest or other scene for an unlimited length of time without interruption, and does not suffer from loss of attention like a human observer. The low-cost, rugged construction, conveniently-processed digital image information, and high performance of the present infrared scanning imager will suggest other uses for the present invention as time passes.

Additional objects and advantages of the present invention will be apparent from a reading of the following detailed description of several exemplary preferred embodiments of the present invention, taken in conjunction with the appended drawing Figures, in which the same reference numeral refers to the same structural element, or to elements which are analogous in structure or function. Among the several views of the drawing Figures, familiar reference numerals will have a prime (') added thereto to reference certain features and to suggest the continuity of function with previously described featured which may differ somewhat in their structure.

BRIEF DESCRIPTION OF THE DRAWING FIGURES

FIG. 1 schematically depicts a scanner portion of a scanning infrared imaging system according to the present invention, which is scanning a section of perimeter fence in order to provide security for an industrial facility;

FIG. 2 diagrammatically depicts a complete scanning imaging system according to the present invention;

FIG. 3 provides a vertical somewhat schematic cross sectional view taken through the scanner seen in FIG. 1;

FIG. 4 provides a perspective functional view of the optical unit of the scanner seen in FIGS. 1–3, which takes the form of a Cassegrain telescope;

FIG. 5 is a perspective view of the detector, thermal enclosure, multiplexers, and other circuity and connection features seen in FIG. 3;

FIG. 6 provides an enlarged fragmentary cross sectional view of a portion of FIG. 3, and shows a detector, thermoelectric cooler, thermal enclosure, and multiplexers, with associated connection features and circuitry of the scanner portion of the present invention;

FIG. 7 provides a plan view of the detector seen in FIGS. 3–6;

FIG. 8 provides an enlarged fragmentary plan view of a section of the detector portion of the scanner seen in FIG. 3–7;

FIG. 9 is a somewhat schematic presentation of an electronics/optical transmitter assembly of the scanner seen in FIGS. 1–3;

FIG. 10 provides a somewhat schematic cross sectional view of an alternative embodiment of a scanner portion of an infrared scanning imager according to the present invention;

FIG. 11 provides a plan view of an alternative detector-element array configuration according to the present invention;

FIG. 12 is a fragmentary longitudinal cross sectional view of an alternative configuration of infrared scanner according to the present invention;

FIG. 13 diagrammatically depicts the scanner portion functional architecture according to the present invention;

FIG. 14 provides a diagrammatic representation of a signal-processing architecture of the present line-scanning infrared imaging system; and FIG. 15 provides a time-diagram of image pixel responses according to alternative signal processing modes of the present line-scanning infrared imaging system.

DETAILED DESCRIPTION OF EXEMPLARY PREFERRED EMBODIMENTS OF THE INVENTION

An Overview

Figure 1:
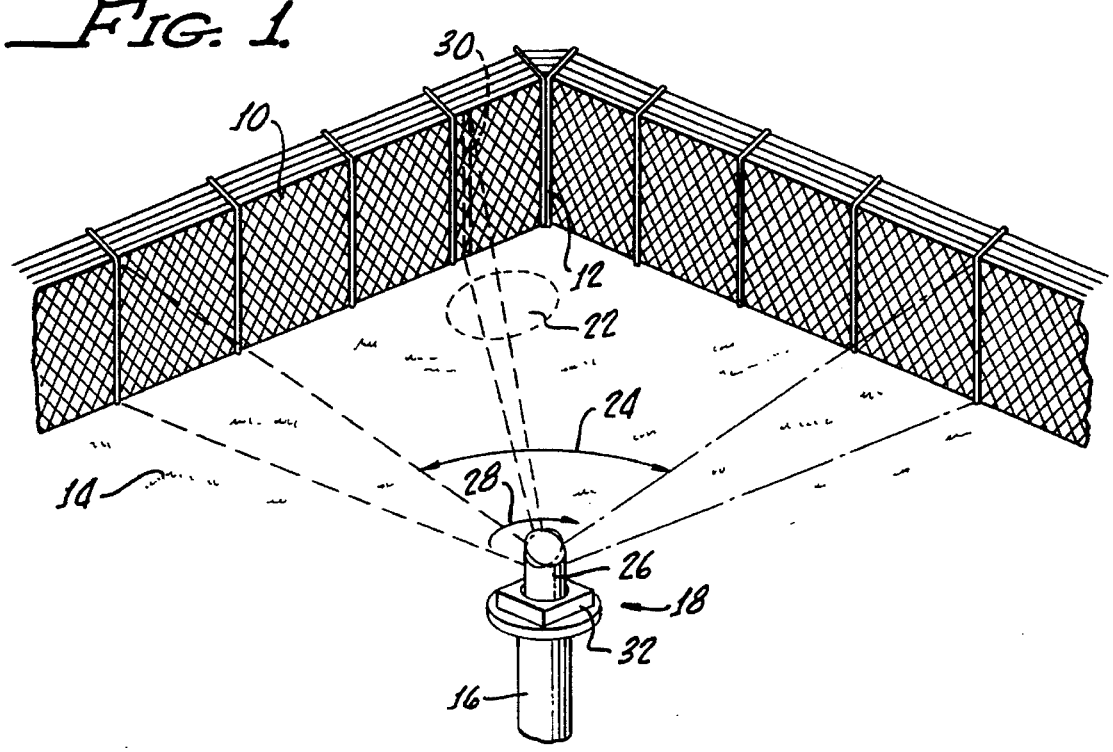

Viewing FIG. 1, a fragmentary schematic depiction is provided of a fence 10, such as may surround an industrial facility. The fence 10 defines a corner 12, and may surround, for example, a yard area 14, which is part of the area of the industrial facility for which a high level of security is desired. Secured to the top of a post 16 in the yard 14 and with a view of the fence 10, is a scanner portion 18 of an infrared line-scanning imaging system 20, more completely seen in FIG. 2. As is seen in FIG. 1, the yard 14 and fence 10 present to the scanner 20, an image volume which is designated with the numeral 22. The image volume 22 extends beyond fence 10, of course, but for purposes of visualization and explanation, the image at the plane of the fence 10 will be considered herein as the feature of interest for the imaging system 20. This image volume 22 may extend in a partial solid-angle 24 (as depicted) around the scanner 18, or may alternatively and selectively extend continuously around the scanner 18 for remotely providing a fully circular image of the scene around scanner 18.

In order to receive and form an image of the image volume 22, the scanner 18 includes turret portion 26, which rotates continuously in one direction, as is indicated with the arrow 28. As will be further explained, this turret portion 26 is an outwardly-visible portion of a moving scanner platform. The turret portion 26 houses part of an optics system (which also will be further described) receiving an image from the image volume 22. For the present purpose of introduction, it should be noted that a vertical linear portion of the scene, or image line 30, is the part of the image which will be received and further processed by the scanner 18. As the turret 26 rotates, the image line 30 sweeps through the image volume 22. With respect to the fence 10, for example, the narrow vertical image line 30 sweeps like a search light repeatedly across the section of fence seen in FIG. 1. As the image line 30 sweeps across the fence 10, the scanner 18 sequentially records successive adjacent lines of image information from the image line 30. These successive adjacent image lines can be fitted together adjacent to one another like a series of narrow vertical photographs to make a mosaic image of the scene at fence 10. As will be described, the successive lines of image information are converted to parallel digital information, then to serial information, are imposed serially as a signal on a carrier light-beam, and is beamed off of the moving scanner platform (turret 26) to a base portion 32 of the scanner 18. Subsequently the image signal is transmitted optically to a processing, storage, analysis, and display portion of the imaging system 18, which portion is generally referenced with the numeral 34 viewing FIG. 2.

Figure 2:
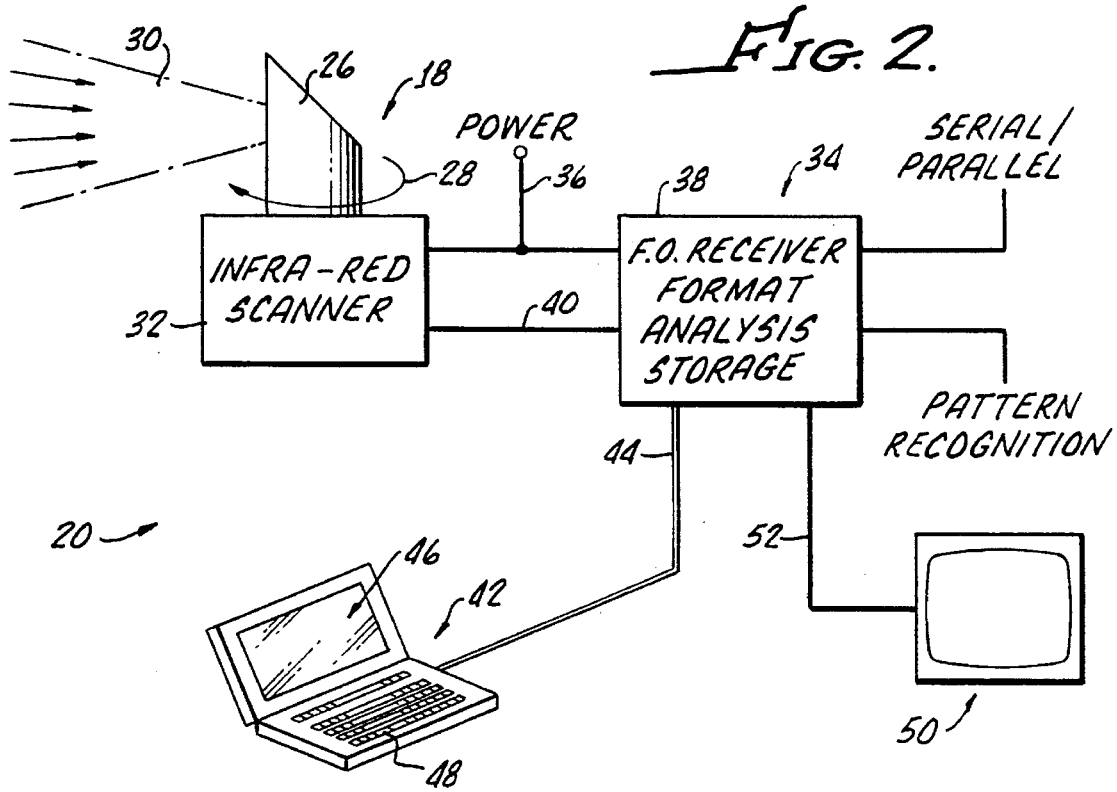

Viewing now FIG. 2 with more particularity, the system 20 includes a power buss 36 which provides power to both the scanner portion 18 of the system, and to the processing, storage, analysis, and display portion 34 of the system 20. Extending from the scanner 18 to a cabinet 38 of the portion 34 of the system 20 is a fiber-optic transmission cable 40. This fiber-optic transmission cable 40 carries the light beam from scanner 18 (which is optically-encoded with image information) from the scanner 18 to the cabinet 38 of the portion 34. At the cabinet 38 of portion 34, additional optical and electronic apparatus (which will be further described) is housed for receiving from the cable 40 the light beam optically-encoded with image information, and for converting this signal to electrical image signals for further processing, analysis, storage, and display. For example, the portion 34 of system 20 may include a computer, such as the depicted lap-top computer 42 which is interfaced with the remainder of system portion 34 by a cable 44 connecting with cabinet 38, or another more powerful computer processor either within or interfaced with the cabinet 38 and the electronic apparatus therein. This lap-top computer 42 includes a liquid crystal display (LCD), on which the image information from the scanner 18 and system portion 34 may be displayed to form an image in near-real time. Alternatively, as will be described, stored image information from the system 34 may be displayed on the LCD 46. This computer 42 also includes a keyboard 48 at which commands for the system 20 may be entered. For example, the system 20 can be configured by commands entered from the keyboard 48 to provide an image output in video format for display on a television set, such as is depicted at 50. The television 50 is interfaced with the cabinet 38 and the electronic apparatus therein via a cable 52. As was mentioned, the system portion 34 includes a storage facility for image information received from the scanner 18. This storage facility may include, for example, a hard-disk drive, receiving and storing the serial electronic bit stream which will result from conversion of the optically-encoded bit stream received over optical cable 40 into electronic format. Image information which is stored at the system portion 34 may be retrieved at any time for viewing, and for comparison with current images from a scene, for example.

Scanner

Figure 3:
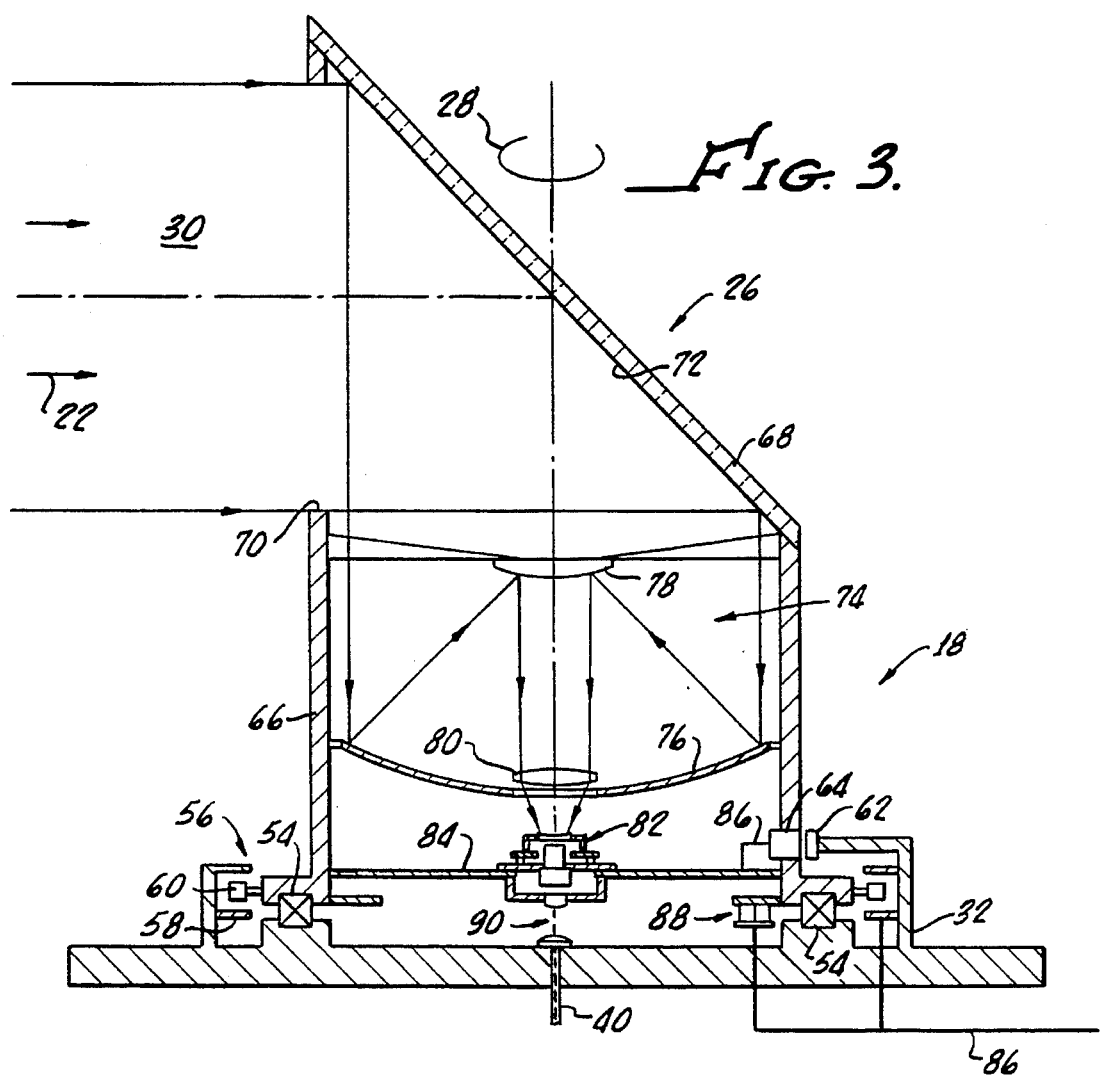

Viewing now FIG. 3, the scanner 18 is schematically depicted in cross section. The scanner 18 includes a base portion 32 to which both the power cable 36 and fiber-optic image signal transmission cable 40 connects. This base 32 carries a bearing assembly, schematically depicted and referenced with the numeral 54. The bearing 54 carries the turret 26. Base portion 32 also carries a brush-less direct-current servo motor, which is schematically depicted and referenced with the numeral 56. This servo motor 56 includes a stator portion 58 mounted to the base 32, and a rotor portion 60 which is mounted to and rotationally drives the turret 26. This motor 56 includes commutation sensors (not shown) for controlling acceleration, speed, and commutation of this servo motor. Preferably, the servo motor 56 is controlled by a phase-locked loop type of motor controller so that the rotational speed of the turret can be precisely controlled and is substantially continuous within each rotation of the turret 26. Also, the base portion 32 carries a frame synchronizing signal source, indicated with the numeral 62. On the turret 26 is carried a frame synchronizing detector 64, which provides a signal each time rotation of the turret carries this detector past the signal source 62.

Figure 4:
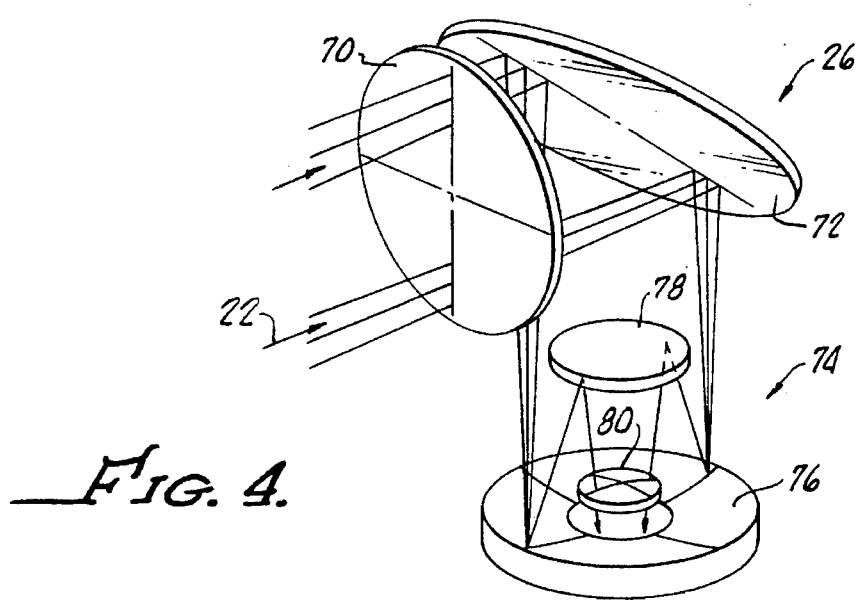

Again considering FIG. 3 in overview, and also considering FIG. 4 for a schematic perspective view of the optical system within this turret, the turret 26 includes an upright cylindrical wall portion 66, which supports an angulated upper wall portion 68, and defines an aperture 70. As depicted, infrared radiation from an image line originating at the scene or image volume 22 enters the aperture 70. On the inner side of the angulated wall 68 is carried a mirrored surface 72. This mirror surface 72 reflects the infrared radiation entering via aperture 70, to an optical portion or Cassegrain telescope optical system, generally referenced with the numeral 74. This optical system 74 includes a first centrally-apertured concave mirror 76, reflecting infrared radiation to a second convex mirror 78. The second mirror 78 reflects the infrared radiation through a lens 80, which is mounted in the central aperture of the first mirror 76, and to a detector module, which is generally referenced with the numeral 82. Even though the optical system 74 provides a complete substantially circular image to the detector module 82. Only successive image lines of this image will be used at any one time. It should be kept in mind that as the scanner 18 rotates, the scene at image volume 22 scans across the detector module 82.

Figure 5:
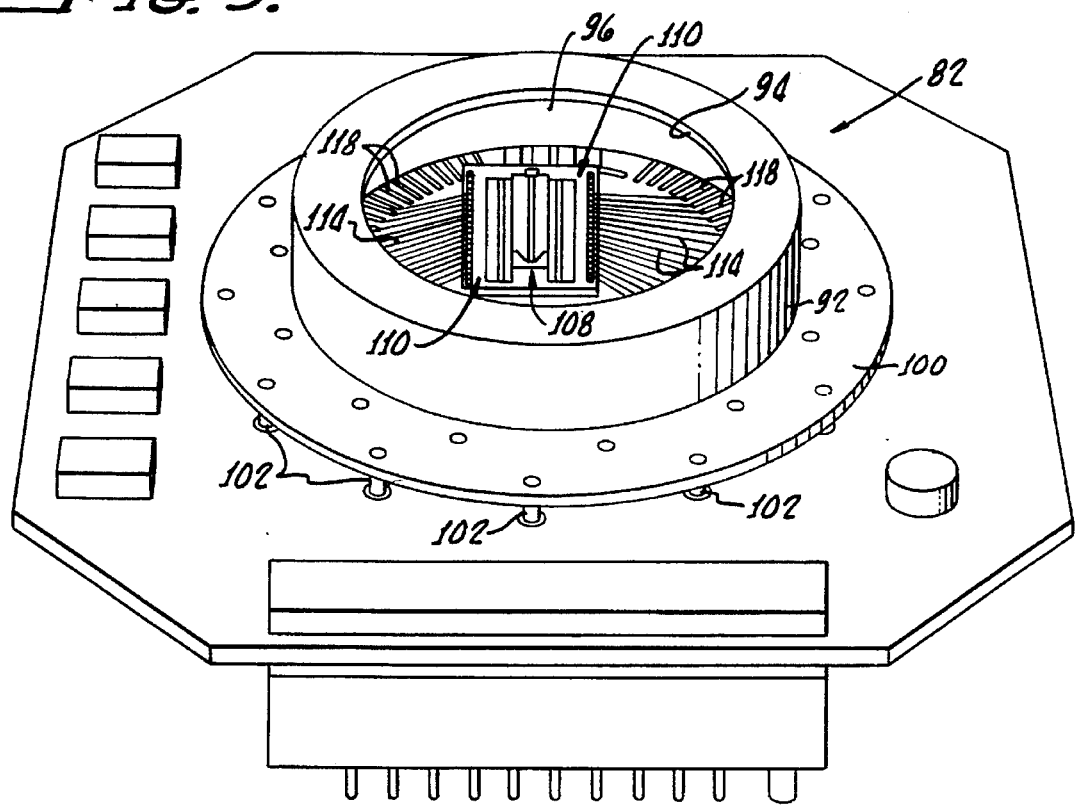

The detector module 82 receives the infrared radiation from the scene or image volume 22, (really from a narrow image-line portion of the scene, as was explained), and converts this infrared radiation into electrical signals, as will be further explained. The detector module 82 is carried on an electronics and optical transmitter assembly 84 (part of which is seen in FIG. 5), which also forms a partition within the turret 26. A cable 86 connects the synchronizing signal detector 64 to the electronics assembly 84. In order to complete this explanation of the scanner 18, it should be noted that this scanner includes a singular slip ring assembly, referenced with the numeral 88, solely for the purpose of transferring power to the rotating turret 26. No control or command signals are transferred to the turret 26 via this slip ring assembly 88, and no image information or signals are transferred from the turret 26 to the base 32 via this slip ring assembly 88. Image information is transferred from turret 26 to base 32 and fiber-optic cable 40 solely by an optical coupling, indicated with the numeral 90.

Detector Module

Figure 6:
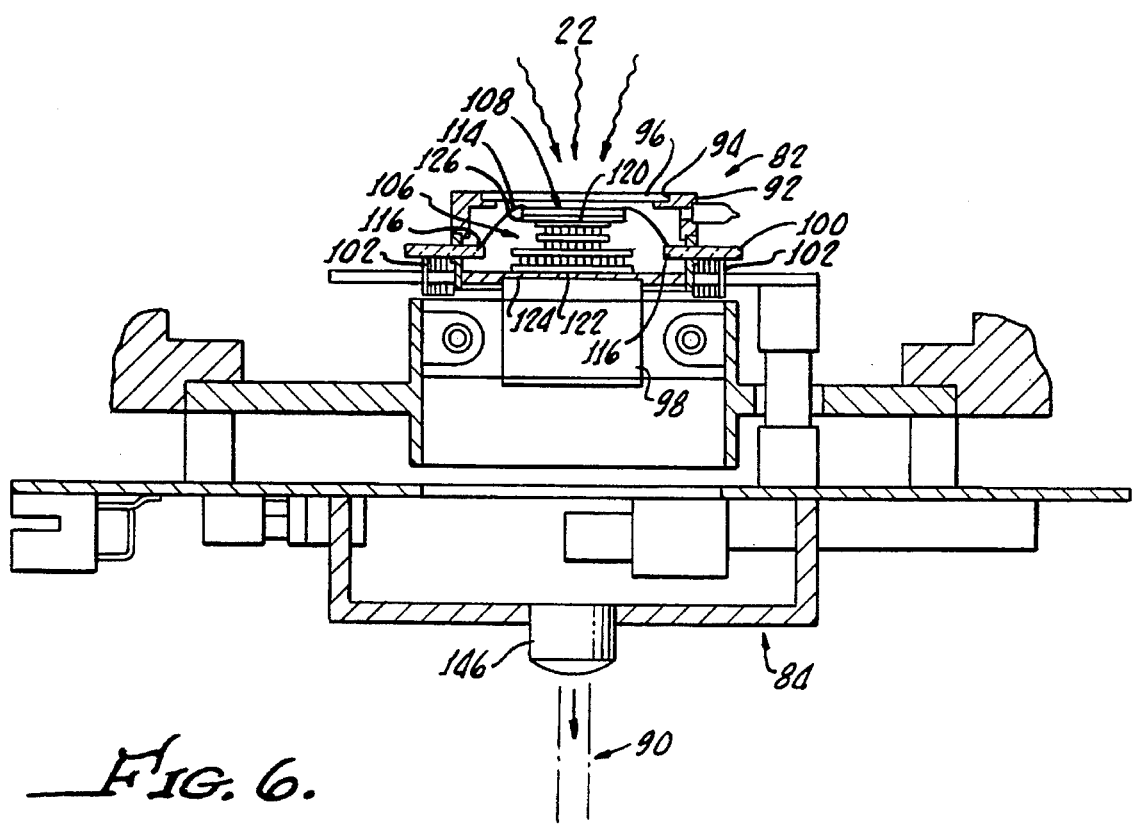

Considering now FIGS. 5–8 in conjunction, with attention first to FIGS. 5 and 6, the detector module 82 is shown in perspective and in cross section. The detector module 82 includes a thermally-insulative housing 92, which upwardly defines an opening 94 into which is sealingly received a window member 96. This window member is transparent to infrared radiation, but opaque to visible light. For purposes of illustration, the window 96 is depicted as though it were transparent. In an actual embodiment of the detector module 82, a person would not be able to view the internal structures of the module through the window 96. Downwardly from the housing 94 depends a heat sink mass 98. For example, the mass 98 may be formed of berilium oxide. Circumferentially around the housing 92, the detector module 82 includes an outwardly extending flange portion 100, on which are carried plural depending electrical contact pins 102. The flange portion 100 sets upon the electronics and optical assembly 84, and the thermal mass 98 is received into a recess or opening of this assembly. The pins 102 provide electrical interface of the detector module 82 with the electronics and optical assembly 84.

The housing 92 sealingly encloses an evacuated chamber 104 within which is received upon a three-stage thermoelectric cooler 106, both a photo-conductive lead selenide (PbSe) detector-array chip 108 and a pair of multiplexing circuit chips 110. The multiplexing circuit chips 110 flank the detector-array chip 108. A pair of respective wire bonds 112, each of multiple conductors, extends laterally between the detector-array chip 108 and each of the multiplexing chips 110. Also, a plurality of conductors 114 extend from the multiplexing circuit chips outwardly to an annular ceramic feed-through portion 116 of the housing 92, viewing FIG. 7. Inwardly of the chamber 104, the ceramic feed-through portion 116 defines plural metallic electrical contact pads 118, to which the conductors 114 are respectively connected individually. Outwardly of the housing 92, the ceramic feed-through portion 116 of the housing defines the flange 100, and carries the depending contact pins 102 in electrical connection individually with the contact pads 118.

The thermoelectric cooler 106 includes three cascaded stages of reversed Peltier-effect cooling semiconductor junctions, which move heat from the upper end of the cooler 106 toward the lower end of this cooler when an appropriate voltage and Current flow is provided in the cooler 106. Consequently, the upper surface 120 of the cooler 106 becomes very cold, and heat is moved to the lower surface 122 of the cooler, warming this lower surface. The lower surface 122 of the cooler 106 is thermally connected to the heat sink mass 98 through the intervening lower wall 124 of the housing 92. Heat sink mass 98 is exposed to the ambient environment around the detector module 82 (on the side of the partition formed by the electronics and optical assembly 84 which is opposite to the window 96), and is cooled by air convection and radiation to the environment. Accordingly, heat from the heat sink thermal mass 98 does not warm surrounding structures by convection or radiation to produce unwanted sources of infrared radiation within the scanner 18 within view of the window 96. At the upper end of the cooler 106, the upper surface 120 is thermally connected to the detector-array chip 108 via an intervening thermally-conductive synthetic sapphire upper mother board member 126. This upper mother board member 126 also carries the multiplexer circuit chips 110, so that these circuit chips are cooled and operate at a low temperature.

Figure 7:
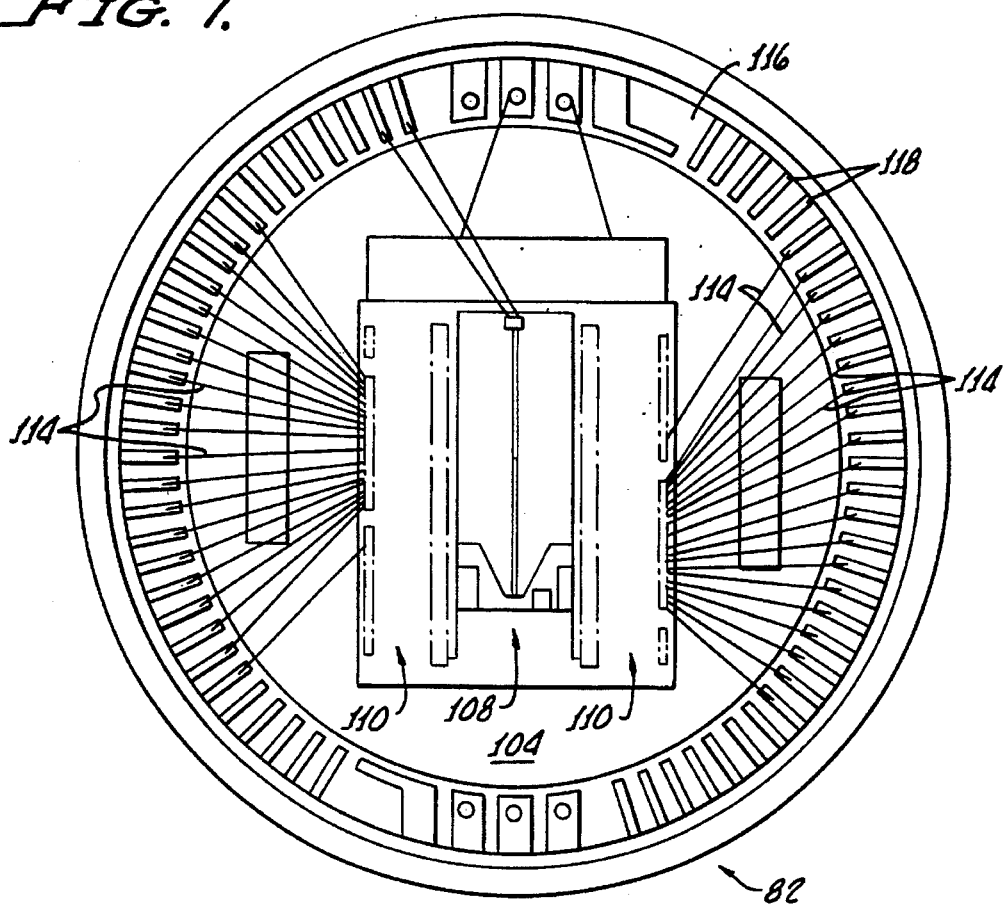
Figure 8:
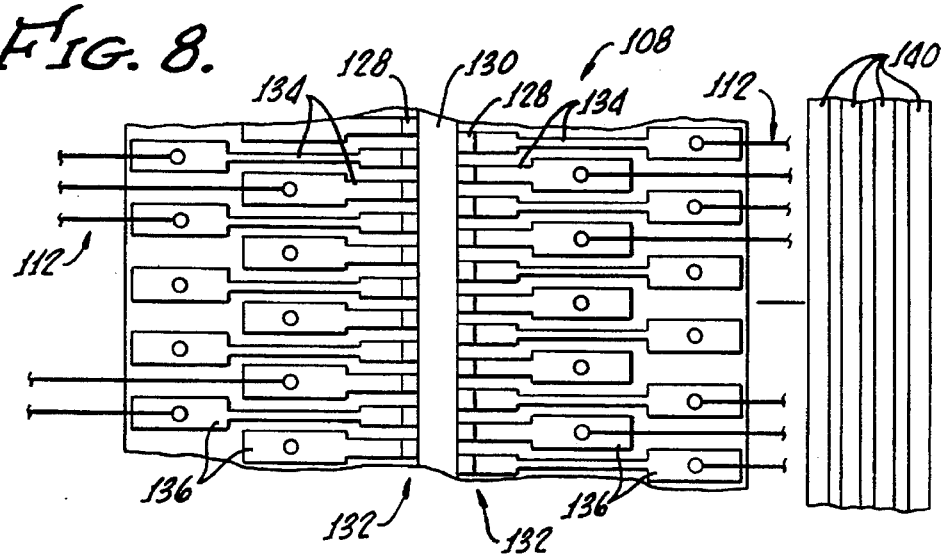

FIG. 8 shows an enlarged fragmentary plan view of a small portion of the detector-array circuit chip 108 seen in FIG. 7. As is shown on FIG. 8, the detector-array chip 108 includes a bi-linear array of PbSe photo-conductive detector elements 128, arrayed on opposite sides of a central conductive metallic trace 130 in two staggered rows 132. This conductive trace 130 has a width of about 0.007 inches, while the detector elements 128 are about 0.0022 inches square on 0.004 inch centers. Because the image elements 128 have a dimension larger than their center-to-center spacing, there is an overlap of about 20 percent between the two rows of detector elements 128. In other words, with the two cooperative rows of detector elements 128, all of the image information which is delivered to the detector-array chip 108 by the optics portion 74 will pass across at least one of the detector elements 128, and will have an opportunity to produce an electrical photo-conductive response.

Preferably, the detector-array chip seen in FIG. 8 includes 256 detector elements 128 arrayed in two closely spaced apart rows 132, each of 128 detector elements. The detector-array chip 108 provides about 20 percent image capture redundancy because of overlap of these detector elements 128. However, as will be seen, a lower number of detector elements 128 can be used to still produce an acceptable image quality without image capture redundancy on the detector module itself, and with signal processing, repeated scans of an image area, or plural detector modules being used to enhance or complete the image produced. Extending in respectively opposite directions from each of the detector elements 128 in each of the two detector rows 132, are respective conductive traces 134 leading individually to respective contact pads 136. The wire bond conductors 112 connect individually at their inner ends to the contact pads 136, and extend to similar contact pads 138 at the multiplexing circuit chips 110. These contact pads 138 at the multiplexing circuit chips 110 are best seen in FIG. 7.

Figure 9:
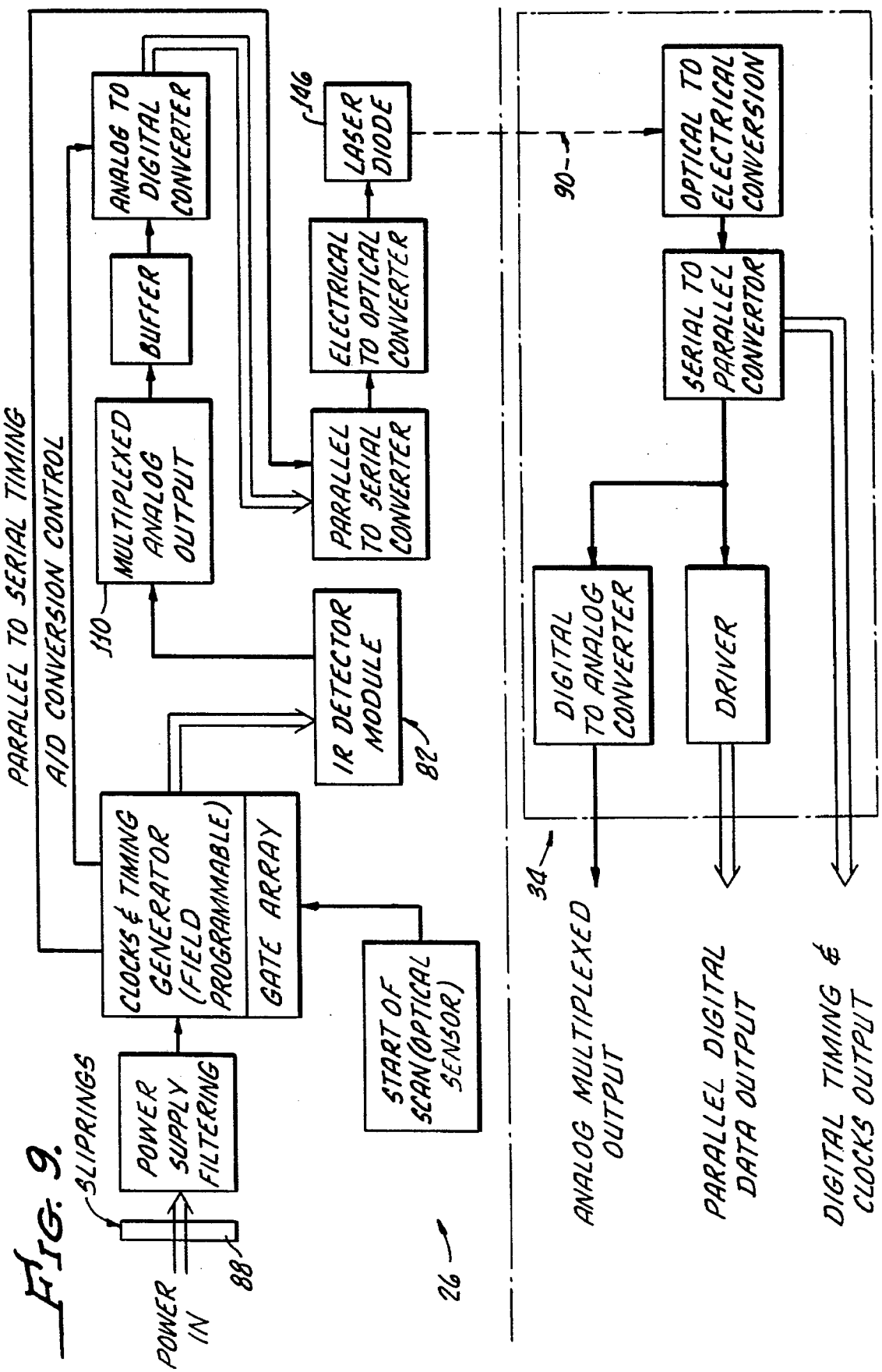

As is further seen viewing FIGS. 7, 8, and 9, the optics portion (Cassegrain telescope) 74, delivers to the detector elements 128 infrared radiation from the scene in image volume 22. This infrared radiation is focused at the focal plane of the telescope, at which is placed the detector-array chip 108. Accordingly, the detector 26 forms an image receiver for the telescope 74 on the detector array chip 108, which is analogous to the eye of an observer. On this image receiver (detector array chip 108), the viewed portion of the scene changes at the detector elements 128 in a direction perpendicular to the length of the detector rows 132 as the scanning platform (turret 26) rotates. The effect is similar to an observer staring out of a very narrow window of a moving rail road car at the scenery passing by. Such a very narrow window would not provide the observer with a very satisfying view of the scenery. However, if the observer were to take a rapid sequence of narrow photographs, and then were to fit these photos together in sequence, a complete mosaic image of the scenery which had passed the narrow window can be assembled.

Diagrammatically, this change of the image across detector-array chip 108 is represented by a plurality of long, narrow sequential image lines 140 approaching the detector elements 128 in FIG. 8, as is represented by the arrow 142. As can be easily envisioned, the image lines 140 adjacent to one another form a mosaic image of the scene in image volume 22. At the detector elements 128, a bias voltage is applied between the trace 130 and the connector pads 136 so that a bias current always flows through the detector elements 128. These photoconductive PbSe photoconductive elements becomes more conductive in response to infrared radiation so that the bias current level changes in response to the infrared radiation from the scene in image volume 22. The image information, then, consists of the differences in the levels of current flow between trace 130 and pads 136 as the infrared radiation from the scene sweeps across the detectors 128 in response to movement of the scanning platform 26.

These electrical current signals from the detector elements 128 are passed directly by the wire bond conductors 112 to the associated contact pads of the multiplexing circuit chips 110. At the multiplexing circuit chips 110, the signals conducted from the individual detector elements 128 of the detector-array chip 108 are biased, filtered, and amplified on the multiplexer circuit. The voltage at the output of each channel of the multiplexer circuit then represents an electrical analog of the infrared image information contained in a particular image line 140. The voltage levels are then serially transferred onto a common output line (conductor) on each of the multiplexing circuit chips 110 by use of a shift register of the multiplexing circuit. This transfer of voltage-level image information from the multiplexer chips 110 takes place at a high speed, and the channels of these multiplexer circuits are prepared to receive and temporarily store image information from the next succeeding image line 140 as the scanner platform (turret 26) rotates to bring these image lines successively across the detector elements 128. The transferred voltage levels are successively converted to parallel-digital format in an analog-to-digital converter, and are converted subsequently to serial-digital format (i.e., to a serial bit stream) in a parallel-to-serial converter, both of which are part of the electronics and optical assembly 84.

Each of the multiplexing circuit chips 110 then provides a respective serial digital signal containing the image information for the image lines 140. These multiplexing circuit chips 110 are synchronized in their operation so that they serially handle and output the image information from the two rows 132 of detector elements 128. For example, the multiplexing circuit chips 110 can alternate in their operation so that all of the image information from the detector elements 128 of one of the rows 132 is fed out serially by the associated one of the multiplexing circuit chips 110, and is followed then by the image information from all of the detector elements 128 of the other row 132 from the other multiplexing circuit chip 110. This alternating of serial bit streams from each of the two rows of detector elements 128 would be repeated for each succeeding image line, with a line-synchronizing signal indicating the start or end of each image line's bit stream. Alternatively, the multiplexing circuit chips 110 can alternate in sequentially providing serial portions of the output signal, which serial portions each represent image information from one of the detector elements, to be followed by image information from the adjacent detector on the other side of the central conductive trace 130, and so on back and forth in stair-step fashion across the trace 130 and along the length of the bi-linear array 108.

The storing, and transferring of image information at the multiplexing circuit chips is conducted at a rate which is synchronized to the rotational scanning motion of the scanning platform (turret 26) so that image lines 140 are sequential and adjacent to one another with little or no image information being lost between image lines. On the electronic and optical assembly 84, the multiplexed signal from the multiplexing circuit chips 110 is digitized in an analog-to-digital-parallel and parallel-to-serial conversion circuit 144 (viewing FIG. 9). The resulting digitized signal is used to drive an optical driver 146 (viewing FIG. 9 and also seen schematically in FIG. 6), which produces a light beam (shown as optical coupling beam 90', viewing FIG. 6) containing the optically-encoded serial-digital image information originating at the detector module 82, and replicative of the image lines from image volume 22. The light beam 90 effectively is an optical image signal representative of the image information contained in the infrared radiation delivered by the optical portion (Cassegrain telescope) 74 to the detector module 82.

In other words, and as will be further explained, the scanner 18 receives image information in the form of infrared radiation from a scene, converts this radiation to an electronic multiplexed serial analog signal containing the image information, converts the electronic serial analog signal to a digital (parallel and then serial) electronic signal, and converts the digital electronic signal to a digitally-encoded light signal which is beamed off the moving scanning platform (turret 26) to the stationary base 32 on the rotational axis of the turret 26 to a receiver 148 located on this rotational axis (still viewing FIG. 6). This light beam coupling 90 is disposed on the rotational axis of the turret 26. On the base 32 is disposed the optical receiver portion 148 of the optical coupling 90, which is also on the rotational axis of the turret 26. This optical receiver 148 receives and connects the beam of light from driver 146 into fiber optic cable 40. This optically-encoded image information is transmitted on cable 40 to the remainder of system 20, as is represented in FIG. 2 by the numeral 34. The detector module 82 described above can use the detector-array chip 108 as described, or may also use an alternative embodiment of detector-array chip which is described below.

Formatting—Storage—Analysis and Display of Image Information

As was explained above, the portion 34 of system 20 (recalling FIG. 2) includes facilities for conversion of the digital optically-encoded image signal received via cable 40 from digital optical to digital electronic, and for electronically storage, analysis, display, and reformatting of the image signal. For example, the portion 34 of system 20 may include an electronic digital processor, and software for pattern recognition, for example, so that a constant pattern from the image volume 22 generates no response from the software. However, an alarm may be sounded by this pattern-recognition software if the pattern changes in selected ways indicative of an intruder at the fence 10. This type of processing of the image information, with an associated alarm function, for example, can eliminate the necessity for a human security officer to watch security video monitor screens.

For a human, watching the screen of a video security monitor is an especially boring job, even when the image originates with a television camera and is a black-and-white or color image of a familiar scene. However, the image does not change significantly for very long periods of time. As a result, the human's attention frequently lapses and intruders are missed because, when an intruder finally does appear, the change in the television picture is not recognized. An infrared image detector produces an image which is otherworldly, and is especially difficult to visually interpret for long periods of time. Accordingly, the digital form of the signal coming from scanner 18 is especially convenient because it is provided in a form more readily processed by digital pattern-recognition software. This image information may be digitally stored, analyzed, and processed in a variety of ways to minimize the burden on a human operator. Also, as will be further explained, the system 20 can provide an image which is edge-enhanced and which is somewhat similar to the image provided by a television camera. This television-like image is preferable for visual viewing by a human operator.

The system 20 can also provide an image indicative of the absolute or comparative (compared to a reference) temperature of image sources in the image information coming from the scanner 18 and image volume 22. This type of image signal format is especially convenient for processing to detect sources of a particular temperature in the image volume, or to distinguish image sources according to their temperature. For example, a person can be distinguished from foliage in the image which just happens to have a human shape by body temperature of the human as compared to a near-ambient temperature for the foliage. As a result, security personnel can avoid mistaking a bush for a trespasser. Other such temperature-distinguishing comparisons are desirable for security and for air-borne mapping uses the present infrared line-scanning imager.

Alternative Scanner

FIG. 10 depicts an alternative embodiment of the invention. In order to obtain reference numerals for use in describing the scanner apparatus of FIG. 10, features which are the same as those depicted and described above, or which are structurally or functionally analogous to these familiar features, are referenced on FIG. 10 with the same numeral used above, and having a prime (') added thereto. Viewing now FIG. 10, a scanner 18' is seen in partial cross sectional view. This scanner 18' includes a housing or base 32', which is a hollow rectangular box-like body, substantially enclosing and rotationally journaling a turret portion 26'. The housing 32' defines a window 150 opening downwardly or to one side, and having a field of view of about 120 degrees. Accordingly, the scanner 18' can provide image information from an image volume encompassing a solid angle 24 of 120° degrees, recalling FIG. 1. This construction, of the scanner 18' makes it particularly suited for air-borne downwardly-looking infrared imaging.

Within the housing 32', a pair of spaced apart partition walls 152 each carry a respective ring bearing 54'. The turret portion 26' is carried by these bearings 54'. At one end, the housing 32' carries an annular slip ring assembly 88', which centrally provides a passage not visible on FIG. 10) through which passes a portion of a fiber optic cable 154. This fiber optic cable 154 originates at the other end of the turret portion 26', where it is connected to an optical driver assembly 146. In the embodiment seen in FIG. 10, the optical driver assembly 146 provides an optically-encoded digital light signal containing the image information from the scanner 18' to the fiber optic cable 154, which extends to the opposite end of the turret portion 26', and extends also through the annular slip ring assembly 88'. As is seen in FIG. 10, the optical coupling beam 90' extends outwardly from within the central passage of the slip ring assembly 88' on the rotational axis of the turret 26', and to the receiver 148, which is mounted to one end of the base housing 32'.

Around the slip ring assembly 88', is disposed the annular brush-less direct-current servo motor 56'. The stator 58' of this motor is carried by the adjacent partition wall 152, while the rotor 60' of the motor 56' is carried by the turret portion 26'. This turret portion 26' also carries an optics portion 74', which includes a mirror surface 72', and a telescope However, the telescope is of a refractive type, including an objective lens system 156 carried by an elongate telescope barrel 158. This telescope barrel defines a stepped internal bore 160 leading to a focusing lens assembly 162. The focusing lens assembly 162 delivers an image of the scene viewed through window 150 to the detector module 82'.

Like the embodiment of the scanner seen in FIGS. 1–4, the scanner of FIG. 10 carries the detector module 82' adjacent to the electronics and optical assembly 84', which includes the optical driver 146 to which the cable 154 connects From the base housing 32', a mount 164 extends toward the turret portion 26', and carries the synchronization signal source 62'. On the electronics and optics assembly 84', which rotates relative to the mount 164, is carried a synchronization signal detector, the general location of which is indicated with the arrowed lead line 64'. It will be understood that although the scanner embodiment of FIGS. 1–3 is shown with its rotational axis for turret 26 vertical, and the scanner embodiment of FIG. 10 is shown with its rotational axis for turret 26' horizontal, neither of these scanner embodiments is so limited. The rotational axis for the turret 26 (or 26') may have any orientation relative which is convenient for the purpose to which the scanners and imaging system is being applied.

Alternative Detector-Element Array

FIG. 11 depicts an enlarged fragmentary plan view like FIG. 8, of an alternative configuration for a detector element array which may be used in any of the scanners of the present invention. The detector element array 108' includes a single linear array of PbSe photoconductive detector elements 128', which are arranged adjacent to a central common conductive trace 130'. The photoconductive detector elements 128' are disposed only on one side of the conductive trace 130', and are spaced apart. For example, the conductive elements 128' may be about 0.037 inch wide, and be arrayed on 0.004 inch centers. Because of the spacing between the detector elements 128', about 8 percent of the image information focused on the detector array 108' will fall between the elements 128', and will be lost However, as will be pointed out, this information loss can be compensated for or avoided according to the present invention. The detector element array 108 preferably includes 128 detector elements, and requires only one multiplexer circuit chip 110, rather than the two multiplexer circuit chips used with the previously-described detector-element array. The detector element array 108' seen in FIG. 11 may be used in any of the alternative scanners 18 depicted and described herein.

Another Alternative Scanner

Viewing FIG. 12, another alternative embodiment of scanner 18" is depicted. This scanner 18" includes construction elements and features which will be familiar from the scanner 18 seen in FIGS. 1–4, and from the scanner 18' seen in FIG. 10. The scanner 18" includes a hollow box-like base housing 32", which defines a window 150" providing a field of view of about 120° degrees. Within the base housing 32", a pair of partition walls 152" carry and journal a turret portion 26". One of the partition walls 152" carries the stator 58" of a brush-less direct current servo motor 56". A slip ring assembly 88" is disposed adjacent to this motor 56" in order to transfer electrical power onto the rotating turret 26". However, the turret portion 26" is considerably different than the turrets 26 and 26' described above because it includes a pair of diametrically-opposite apertures 70", a double-sided angulated wall 68" carrying a mirror surface 72" on each opposite side thereof, and a pair of Cassegrain-type reflecting telescopic optical units 74" arranged in opposition to one another. The turret portion 26" also carries a pair of detector modules 82", each associated with one of the opposite telescopic optical units 74", and arranged at opposite ends of the turret portion 26".

At the end of the turret portion 26" opposite from the slip ring assembly 88" and motor 56", an electronics and optical assembly 84" receives multiplexed image information from each of the detector modules 82" and provides an optically-encoded digital signal to cable 40" via an optical light-beam coupling 90". As will be further explained, if the scanner 26" uses the 128 element detector-array chip 108' depicted and described in connection with FIG. 11, each of the detector modules 82" will have some loss of image information. However, the two detector modules 82" of the scanner 18" will inherently see slightly different views of the image volume because of movement of the scanner 18" between successive image lines from each of the detector modules, as well as because of inevitable slight differences between the optical units 74" and the detectors 82" themselves. As a result, even though some of the image information is lost at one detector, this same image information, or information completing a substantially complete mosaic of the image volume 22, will be picked up at the next or succeeding scans of the other detector 82", and will appear in the serial stream of digital image information fed out on cable 40".

Image Signal Generation and Processing

Figure 13:
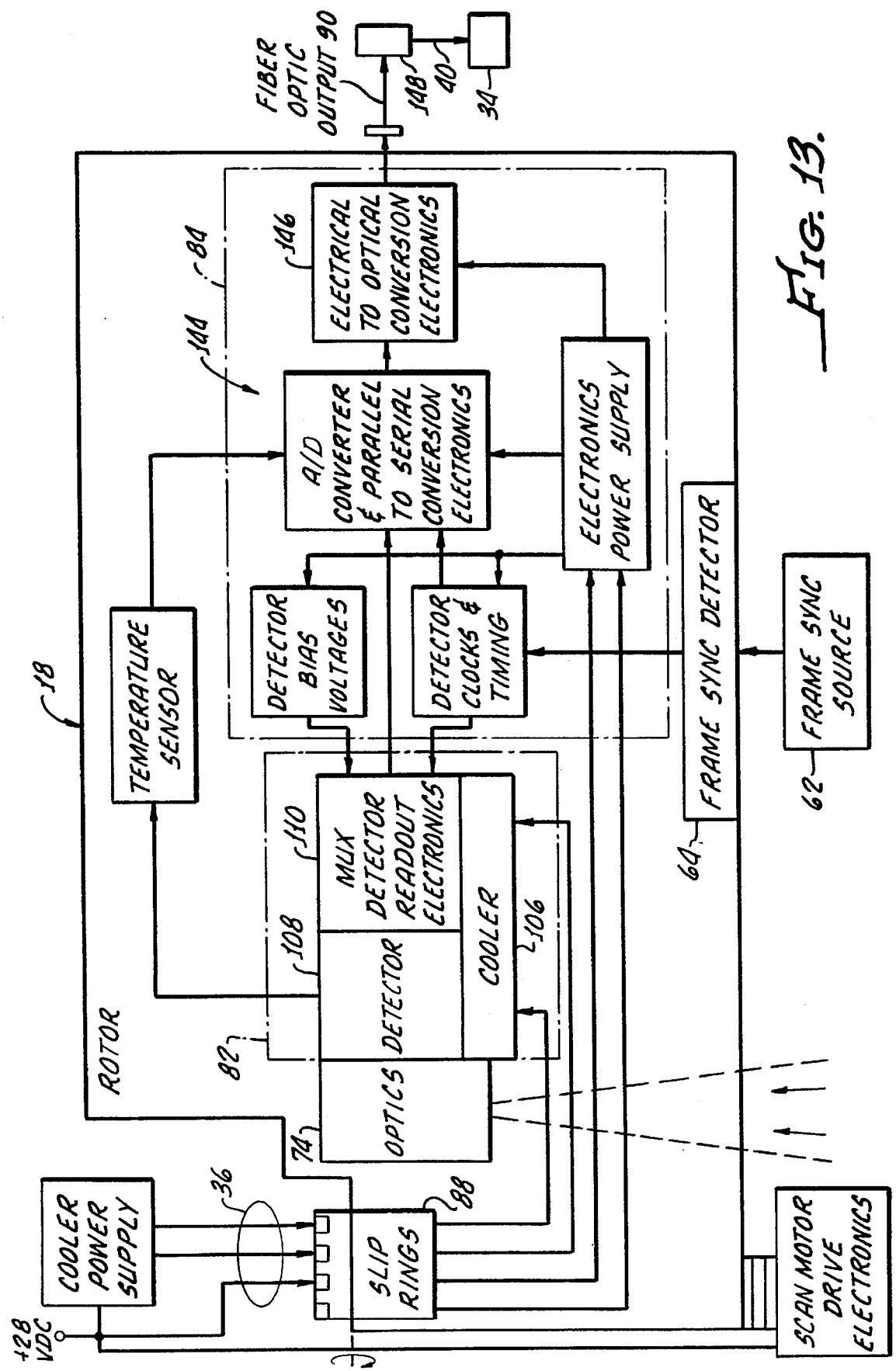
Figure 14:
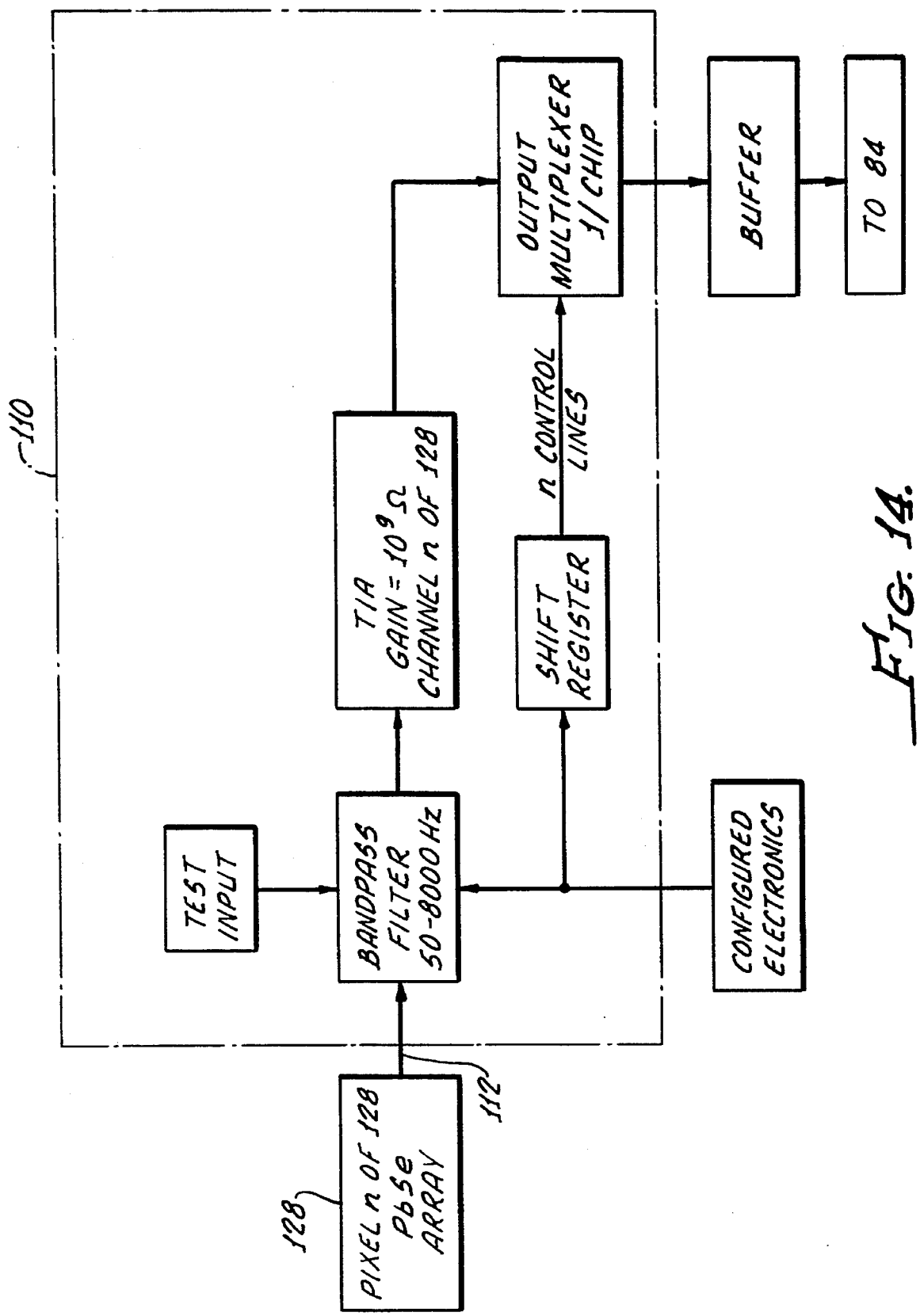

In order to provide a better understanding of how the image information received by the scanners 18 is converted to a serial stream of optically-encoded digital information, is beamed off the rotating scanning platform of the scanners 18, and is then reformatted or converted back to electronic digital image information for further analysis, processing, storage, and display, attention is directed to FIGS. 13–15 in conjunction, as well as recalling the description of FIGS. 8 and 9. It will be recalled that the image falling on the detector elements 128 causes certain ones of these elements to become more conductive in accord with the level of infrared radiation flux falling on these detector elements. A bias voltage maintained between the conductive trace 130 and the contact pads 136 ensures that a bias current level always flows through the detector elements 128. As these detector elements 128 receive varying levels of infrared radiation from the image volume 22, the level of current flow varies. These changes in current flow level are representative of the image information, and become the geneses for the various forms of image signals to be produced from these current changes.

Viewing the diagrammatic representation of Figures 13, and 14, the detector 108 and multiplexers 110 are each associated with and cooled by the thermoelectric cooler 106. The multiplexed voltage levels from the detector elements 128 are converted to 12-bit digital words by the analog-to-digital conversion circuit 144 of the electronics and optical assembly 84. These 12-bit digital words are then converted to serial bit streams by a parallel-to-serial conversion circuit. The result is that the optical driver receives electrically and beams out optically, bursts of 128 (or 256) 12-bit serial words, which represent one vertical image line from the image volume 22. The bursts of serial binary words are beamed optically from the moving scanning platform (turret) 26 to the stationary world (base 32) via the optical coupling 90.

The optical driver 146 may include, for example, a light-emitting diode (not shown), which receives an electrical binary signal from the electronics of the assembly 84, and produces a pulsed light signal (optical coupling beam 90) in response thereto. Because this optical coupling beam is disposed on the rotational axis of the scanning platform, rotation of this platform has no effect on the transmission of the optically-encoded digital image information. This information is received by receiver 148, transmitted through optical cable 40, and is converted back to electrical digital image information at the portion 34 of the system 20.

FIG. 15 shows that the image information from the scanner 18 may be processed in a variety of ways to produce a variety of images for viewing or for further processing and analysis. Ordinarily, an infrared image is rich in low-frequency noise. In order to distinguish the image information of interest from the noise present in the signal, a high-frequency band-pass filter can be used to remove the low-frequency noise. For example, an AVG mode of image processing, the current from each detector element 128 is subtracted from a weighted average of recent previous current levels from that same detector element, and the result is coupled to the electronics and optical assembly 84 with a 50 Hz roll-off. This mode of operation provides an image with some edge enhancement for better pattern recognition.

In an alternative mode of operation, referred to as LST mode, each successive detector element output level is compared derivatively to (or subtracted from) previous outputs from the same detector element in order to give a true spatial derivative image. This image is highly discriminatory of changes or differences in temperature at particular detector elements, so that, for example, a warm-blooded creature moving across a relatively cool image background would be accentuated.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. An infrared imager comprising:

an infrared detector having plural photoconductive infrared detector elements, said plural detector elements of said detector being configured in an array, each one of said plural detector elements providing a corresponding electrical signal indicative of infrared radiation falling thereon;

a multiplexing circuit successively selecting one of said plural electrical signals and connecting a corresponding signal to a singular output conductor;

a scanner delivering infrared radiation from a scene to be imaged to said detector;

a thermoelectric cooler having a cooling surface in heat-transfer relation with said infrared detector, and a heating surface;

said thermoelectric cooler being of multistage design having at least two cascaded stages of semiconductor junctions of reversed Peltier-effect type; and further including a thermal housing surrounding all of said infrared detector and said array of photoconductive detector elements, said multiplexing circuit, and said thermoelectric cooler.

2. The infrared imager of claim 1 wherein said thermal housing includes an outwardly exposed thermal mass heat sink in heat transfer relation with said heating surface of said thermoelectric cooler.

3. The infrared imager of claim 1 wherein said thermal housing defines an evacuated chamber therein within which is received said infrared detector with said array of detector elements, said multiplexing circuit, and said thermoelectric cooler.

4. The infrared imager of claim 3 wherein said thermal housing includes an annular ceramic feed-through member defining a portion of said evacuated chamber and also providing for electrical connection of said infrared detector, said multiplexing circuit, and said thermoelectric cooler externally of said thermal housing.

5. The infrared imager of claim 1 wherein said infrared detector elements are of lead selenide (PbSe) photoconductive material.

6. An infrared imager line-scanning imager including a scanner portion comprising:

a base housing movably carrying a scanning platform, an optical unit carried by said scanning platform for receiving infrared radiation from a distant scene and focusing said infrared radiation upon an infrared detector;

an infrared detector module carried upon said scanning platform and including said infrared detector which has plural photoconductive infrared detector elements linearly arrayed, each one of said plural detector element providing a corresponding one of a plurality of electrical signals indicative of infrared radiation flux falling on the corresponding detector element, a multiplexing circuit sequentially connecting selected ones of said plurality of electrical signals to a single output conductor, a multi-stage thermoelectric cooler in heat-transfer relation with and cooling each of said infrared detector and said multiplexing circuit; and a thermal housing enclosing all of: said infrared detector, said multiplexing circuit, and said thermoelectric cooler; and said thermal housing providing for conducting electrical power into said housing and for transfer of heat and said electrical signals out of said housing;

an electronics/optical assembly means carried upon said scanner platform for receiving said electrical signals from said infrared detector of said detector module, for converting said electrical signals into an optically-encoded serial digital signal, and for beaming said optically-encoded signal off of said movable scanning platform.

7. The infrared line-scanning imager of claim 6 wherein said scanner portion further includes said optical unit including a refractive telescope.

8. The infrared line-scanning imager of claim 6 wherein said scanner portion further includes said optical unit including a Cassegrain-type reflecting telescope.

9. The infrared line-scanning imager of claim 6 wherein said scanner portion further includes a brush-less direct-current servo motor carried by said base housing portion and rotationally driving said scanning platform.

10. The infrared line-scanning imager of claim 9 wherein said servo motor includes a stator portion carried by said base housing, and a rotor portion drivingly connected to and moving with said scanning platform.

11. The infrared line-scanning imager of claim 6 wherein said infrared detector module further includes a detector-element array chip having plural lead selenide photoconductive detector elements linearly arrayed.

12. The infrared line-scanning imager of claim 11 wherein said detector-element array chip further includes a second linear array of lead selenide detector elements arrayed in parallel staggered relation with the first-recited linear array of said detector elements.

13. The infrared line-scanning imager of claim 12 wherein said first-recited and said second linear arrays of lead selenide detector elements are each connected to a single common conductive trace, and to respective individual ones of plural contract pads corresponding to said plural detector elements.

14. An infrared scanning imager comprising: a rotating scanning platform, an infrared detector carried upon said rotating scanning platform and responsive to infrared radiation to provide an electrical image signal, electro-optic means carried upon said rotating scanning platform for receiving said electrical image signal and for providing in response thereto an optical light beam image signal encoded as a serial bit stream, and optical coupling means for beaming said light beam image signal off of said rotating scanning platform to a receiver carried on a non-rotating base.

15. The infrared scanning imager of claim 14 wherein said scanning platform is rotational about an axis passing through said scanning platform.

16. The infrared scanning imager of claim 15 wherein said optical coupling means beams said light beam signal off of said scanning platform along said axis.

17. The infrared scanning imager of claim 15 wherein said scanning platform rotates continuously in a single direction.

18. The infrared scanning imager of claim 14 wherein said scanning platform is configured as an upright turret rotational about a substantially vertical scanning axis.

19. The infrared scanning imager of claim 14 wherein said scanner further includes a telescopic optical unit delivering infrared radiation from a scene to said infrared detector.

20. The infrared scanning imager of claim 19 wherein said optical unit telescope is of refractive type.

21. The infrared scanning imager of claim 19 wherein said optical unit is of reflective Cassegrain telescope type.

22. The infrared scanning imager of claim 14 wherein said scanning platform is configured as an elongate barrel-like turret having a length, and rotating about an axis parallel with said length.

23. The infrared scanning imager of claim 22 wherein said optical unit is oriented along the length of said turret.

24. An infrared scanning imager comprising: a moving scanning platform, an infrared detector carried upon said scanning platform and responsive to infrared radiation to provide an electrical image signal, a telescopic optical unit carried upon said scanning platform for delivering infrared radiation from a_scene to said infrared detector, electro-optic means carried upon said scanning platform for receiving for receiving said electrical image signal and for providing in response thereto an encoded optical light beam image signal, and optical coupling means for beaming said light beam image signal off of said moving scanning platform to a receiver carried on a non-moving base; wherein said scanning platform is configured as an elongate barrel-like turret having a length, and rotating about an axis parallel with said length; wherein said telescopic optical unit is oriented along the length of said barrel-like turret; and wherein said scanner includes a pair of said detectors one disposed at each opposite end of said barrel-like turret, and a pair of said telescopic optical units oppositely disposed along the length of said barrel-like turret.

25. The infrared scanning imager of claim 24 wherein said elongate barrel-like turret further includes a centrally located angulated wall portion having opposite sides, said angulated wall portion carrying a respective mirror surface on each of its said opposite sides for reflecting radiation to a corresponding one of said telescopic optical units and infrared detectors.

26. A method of providing a visible image replicating a scene having elements which are radiating or reflecting invisible infrared radiation, said method comprising the steps of:

providing an infrared detector responsive to infrared radiation to provide an electrical image signal;

providing an optical portion directing infrared radiation from said scene onto said detector to provide from said detector a first electrical image signal containing image information from said scene;

converting said electrical image signal to an optical light beam image signal which is digitally encoded with a serial bit stream carrying said image information from said scene;

beaming said optical light beam image signal axially on an axis of rotation across an interface between a rotating light-beam transmitter and a non-rotating light-beam receiver therefor;

using said optical light beam receiver to convert said optical light beam signal to a second electrical image signal containing image information from said scene;

and using said second electrical signal to produce an image replicative of said scene, 27. The method of claim 26 further including the step of utilizing a scanner having a rotational scanning platform carried upon a non-rotating base portion to respectively carry said rotating light-beam transmitter and said non-rotating light-beam receiver.

28. The method of claim 27 further including the step of utilizing said scanning platform to carry both said optical portion and said infrared detector.

29. The method of claim 28 further including the step of utilizing a thermoelectric cooler carried also upon said scanning platform to cool said infrared detector.

30. The method of claim 28 further including the step of also carrying on said scanning platform an electrical/optical assembly receiving said first electrical signal and producing said optical light beam image signal in response thereto.

31. The method of claim 26 further including the step of utilizing a fiber optic conductor to convey said optical light beam image signal from said receiver therefor to a facility for conversion of said optical light beam image signal into said second electrical image signal.

* * * * *